(12) United States Patent
Allor et al.

(10) Patent No.: US 11,593,393 B1
(45) Date of Patent: Feb. 28, 2023

(54) SYSTEMS AND METHODS FOR PROVIDING AUTOMATED INTEGRATION AND ERROR RESOLUTION OF RECORDS IN COMPLEX DATA SYSTEMS

(71) Applicant: Cigna Intellectual Property, Inc., Wilmington, DE (US)

(72) Inventors: Michael R. Allor, Mesa, AZ (US); Robert M. Easterlin, Charleston, SC (US); Rich D. Powell, New Bern, NC (US)

(73) Assignee: Cigna Intellectual Property, Inc., Wilmington, DE (US)

( * ) Notice: Subject to any disclaimer, the term of this patent is extended or adjusted under 35 U.S.C. 154(b) by 284 days.

(21) Appl. No.: 16/882,381

(22) Filed: May 22, 2020

(51) Int. Cl.
*G06F 16/00* (2019.01)
*G06F 16/25* (2019.01)
(Continued)

(52) U.S. Cl.
CPC .......... *G06F 16/254* (2019.01); *G06F 16/219* (2019.01); *G06F 16/245* (2019.01);
(Continued)

(58) Field of Classification Search
CPC ...... G06F 16/93; G06F 30/00; G06F 30/3312; G06F 11/008; G06F 11/0715; G06F 11/0718; G06F 11/0751; G06F 11/0778; G06F 11/079; G06F 11/3003; G06F 11/3037; G06F 11/34; G06F 11/3409; G06F 11/3419; G06F 11/3452; G06F 11/3471; G06F 16/1824; G06F 16/21; G06F 16/22; G06F 16/285; G06F 2201/865; G06F 2201/88; G06F 9/45533; G06F 9/4881; G06F 16/248; G06F 1/00; G06F 21/554; G06F 21/62; G06F 2221/034; G06F 8/35; G06F 11/0709; G06F 11/0793; G06F 11/28; G06F 16/122; G06F 16/14; G06F 21/6209; G06F 21/6218

See application file for complete search history.

(56) References Cited

U.S. PATENT DOCUMENTS 7,653,631 B1* 1/2010 Lundberg ............... G06Q 10/10
707/636
8,706,514 B1* 4/2014 Goodall ................. G16H 50/80
703/2

(Continued)

*Primary Examiner* — Yicun Wu
(74) *Attorney, Agent, or Firm* — Jordan IP Law

(57) ABSTRACT

A claim editing engine for automated integration and error resolution of claim records is provided. The processor of the engine is configured to extract a set of claim components of a plurality of claim components. The processor is further configured to transform the set of claim components to conform to a standardized data format. The processor is also configured to integrate the set of transformed claim components into a set of unified claims by unifying each of the set of transformed claim components having matching claim identifiers into a unified claim. The processor is configured to apply a rule set to the set of unified claims to generate a simulation of execution of the set of claims and identify errors in the simulated execution. The processor is configured to transmit an instruction to resolve each identified error. The processor is configured to cause each resolved unified claim to be processed.

20 Claims, 8 Drawing Sheets

(51) Int. Cl.
  *G06F 16/21* (2019.01)
  *G06Q 40/08* (2012.01)
  *G06Q 10/10* (2023.01)
  *G06Q 10/067* (2023.01)
  *G06F 16/245* (2019.01)

(52) U.S. Cl.
  CPC .......... *G06Q 10/067* (2013.01); *G06Q 10/10* (2013.01); *G06Q 40/08* (2013.01)

(56) References Cited

U.S. PATENT DOCUMENTS

| | | |
|---|---|---|
| 9,734,221 B2 | 8/2017 | Sarferaz |
| 10,275,176 B1 | 4/2019 | Gold |
| 10,429,188 B2 | 10/2019 | Robinson |
| 10,466,867 B2 | 11/2019 | Boucher |
| 10,606,861 B2 | 3/2020 | Reddy |
| 10,620,917 B2 | 4/2020 | McDaniel |
| 2002/0108077 A1* | 8/2002 | Havekost ............ G05B 23/0289 714/47.2 |
| 2008/0077935 A1* | 3/2008 | Breiter .................... G06F 11/28 718/108 |
| 2009/0222586 A1* | 9/2009 | Hibbets ............... H04L 41/5074 709/246 |
| 2014/0136216 A1* | 5/2014 | Beebe .................... G06Q 40/08 705/2 |
| 2016/0328526 A1* | 11/2016 | Park ........................ G16Z 99/00 |
| 2018/0196878 A1 | 7/2018 | Iball |
| 2018/0374033 A1 | 12/2018 | Beecham |
| 2020/0210944 A1 | 7/2020 | Lenzen |
| 2020/0293378 A1 | 9/2020 | Gold |

\* cited by examiner

SYSTEMS AND METHODS FOR PROVIDING AUTOMATED INTEGRATION AND ERROR RESOLUTION OF RECORDS IN COMPLEX DATA SYSTEMS

FIELD OF INVENTION

The field relates to advanced techniques for automated methods of defining, integrating, and error resolution of records in complex data systems.

BACKGROUND OF THE DISCLOSURE

In complex data processing systems, such as medical and insurance claim centers, hundreds or thousands of distinct data records may interrelate with one another such that they all relate to the same "claim" or "case". As such, in order to update a particular case, updates to hundreds or thousands of records may need to be made. Complicating matters, in many such data processing systems, the underlying data records may be written in a variety of formats and are stored or available in a variety of disparate data systems. For a particular case or claim, some data records may be of significant importance and yet unlinked to other related data records.

Further, in many such data processing systems, claims or cases are processed linearly using manual intervention. Individual cases or claims are processed by users utilizing dozens or hundreds of distinct data processing tools such as business analytic tools.

Compounding problems further, in many claim processing systems or case processing systems there is tremendous time sensitivity that requires that a particular claim or case be processed and resolved within a narrow time window. Because of the complexity of such claim or case processing, known systems require significant deployment of manually driven systems in order to effect claim processing. Further, the complex interdependencies of claim data may cause an inaccurate edit to a claim to cause subsequent errors (e.g., a chain reaction of errors) or cause a processing error.

Accordingly, systems and methods are desired for automated definition, integration, processing, and editing of claim and case records in complex data systems.

BRIEF SUMMARY OF THE INVENTION

In one aspect, a claim editing system for automated integration and error resolution of claim records is provided. The claim editing system includes a data warehouse system including a data warehouse processor and a data warehouse memory. The data warehouse system also includes a plurality of claim components. Each claim component is associated with a claim identifier. The claim editing system also includes a claim editing engine in communication with the data warehouse system. The claim editing engine includes a processor and a memory. The processor is configured to extract a set of claim components of the plurality of claim components from the data warehouse system. The processor is also configured to transform the set of claim components to conform to a standardized data format for each of the set of claim components. The processor is further configured to integrate the set of transformed claim components into a set of unified claims by unifying each of the set of transformed claim components having matching claim identifiers into a unified claim. Each unified claim includes unified claim components. The processor is also configured to apply a rule set to the set of unified claims to generate a simulation of execution of the set of claims and to identify errors in the simulated execution. The processor is further configured to transmit an instruction to resolve each identified error associated with each simulated executed claim. The processor is also configured to cause each resolved unified claim to be processed.

In another aspect, a method for automated integration and error resolution of claim records is provided. The method is performed by a claim editing engine in communication with a data warehouse system. The claim editing engine includes a processor and a memory. The data warehouse system includes a data warehouse processor and a data warehouse memory. The data warehouse system also includes a plurality of claim components each associated with a claim identifier. The method includes extracting a set of claim components of the plurality of claim components from the data warehouse system. The method also includes transforming the set of claim components to conform to a standardized data format for each of the set of claim components. The method additionally includes integrating the set of transformed claim components into a set of unified claims by unifying each of the set of transformed claim components having matching claim identifiers into a unified claim. Each unified claim includes unified claim components. The method also includes applying a rule set to the set of unified claims to generate a simulation of execution of the set of claims and identify errors in the simulated execution. The method further includes transmitting an instruction to resolve each identified error associated with each simulated executed claim. The method additionally includes causing each resolved unified claim to be processed.

In yet another aspect, a claim editing engine for automated integration and error resolution of claim records is provided. The claim editing engine includes a processor and a memory. The processor is configured to extract a set of claim components of a plurality of claim components. The processor is further configured to transform the set of claim components to conform to a standardized data format for each of the set of claim components. The processor is also configured to integrate the set of transformed claim components into a set of unified claims by unifying each of the set of transformed claim components having matching claim identifiers into a unified claim. Each unified claim includes unified claim components. The processor is additionally configured to apply a rule set to the set of unified claims to generate a simulation of execution of the set of claims and identify errors in the simulated execution. The processor is further configured to transmit an instruction to resolve each identified error associated with each simulated executed claim. The processor is also configured to cause each resolved unified claim to be processed.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein.

In the drawings, reference numbers may be reused to identify similar and/or identical elements.

DETAILED DESCRIPTION

Figure 1:
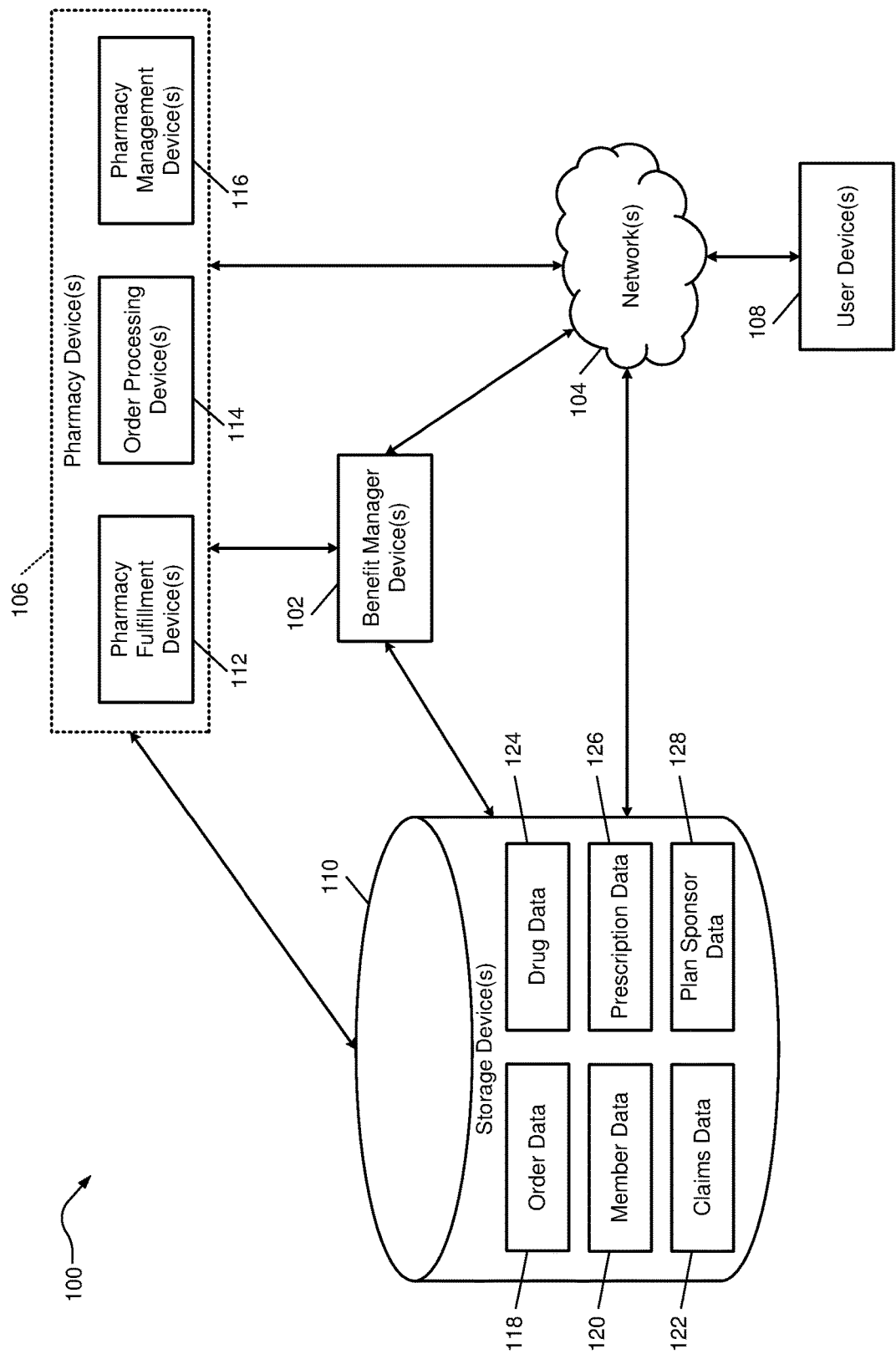
FIG. 1 is a functional block diagram of an example system including a high-volume pharmacy.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred methods and materials are described below.

As used herein, the term "extraction" or "data extraction" refers to process of obtaining data or copies of data, or moving data from homogeneous or heterogeneous information stores, such as data warehouses. As used herein, "extraction" may be used in the context of an "extraction, transformation, loading" or "ETL" process that allows for copying or moving data from one or more data sources into a destination or target system representing the data in a different context or format from the original data sources.

As used herein, a tree is an abstract data type that simulates a hierarchical tree structure, with a root value and subtrees of children with a parent node, represented as a set of linked nodes. The term "tree structure" refers to a form of representing the hierarchical nature of a structure in a graphical form. It is named a "tree structure" because the classic representation resembles a tree.

The claim editing systems and methods described herein are configured to address known technological problems in computing systems and networks that process medical and insurance claim and case information. Specifically, in many known data processing systems including claim and case data, errors frequently occur and are difficult to identify or resolve. Error identification and resolution is complicated because of significant technical problems. First, claim data is typically distributed into dozens, hundreds, or thousands of distinct component records. In order to identify claim errors requiring changes (or "edits"), review of the component records is often required. Moreover, the various component records for a given claim record are often stored and written in many distinct systems and in many different formats. As such, the lack of a centralized claim or case record makes processing challenging. Second, identifying claim errors requires analysis of claim data (including component records) across multiple providers and authorization types across varying scopes of claim data. Because of the complexity of claim records, known systems fail to identify problems requiring edits in a timely manner and further fail to provide potential resolutions (i.e., recommended edits) to the claims. The systems and methods describe provide multiple technological solutions necessarily rooted in computing technology to address these known problems. First, the claim editing systems and methods provide a method that harmonizes component claim records into an integrated (or "unified") claim record. Second, the claim editing systems and methods provide a robust method of defining a "rule set" that can be used to analyze the unified claim record and identify errors in a claim. The claim editing systems use the rule set to simulate the execution of a claim record or claim records (including across providers or authorization types) and identify expected errors. In many examples, the rule set can recursively call different rules and create a tree-structure for claim analysis and simulation. The claim editing system utilizes the rule sets to automatically identify errors in claims and, in many embodiments, resolve the errors or recommend methods for resolving the errors. Known systems and methods fail to provide these benefits. In many known systems, human analysts are required to review claim components on a granular basis (e.g., reviewing each "edit" or change to a claim) without any method of viewing or analyzing the entirety of a claim record as a whole, or analyzing the claim record with a robust rule set as described herein. Instead, in known systems data is obtained for hundreds or thousands of claim components and manually reviewed and adjusted. Because of the manual aspect of known systems, there is significant risk of further errors. Errors in claim records can have significant ramifications including, for example, stopping the execution of a claim process. Accordingly, the claim editing systems and methods described resolve known problems in computing technology using technical solutions.

In the example embodiment, the claim editing system described includes a data warehouse system and a claim editing engine. The data warehouse system includes a data warehouse processor and a data warehouse memory. The data warehouse system also includes claim components each associated with a claim identifier. As described herein, claim components with the same claim identifier are associated with the same claim. The claim editing engine is in communication with the data warehouse system. The claim editing engine includes a processor and a memory. The processor of the claim editing engine is configured to extract a set of claim components of the plurality of claim components from the data warehouse system. In the example embodiment, the claim components of the claims (and any particular claim) are stored in dozens, hundreds, or thousands of distinct files or data records. In many examples, the claim components are stored on multiple devices or systems. In the example embodiment, the data warehouse has access to such systems and all of the claim component records. However, in some embodiments, the processor is configured to extract a set of claim components of the plurality of claim components from a plurality of claim processing devices that store the claim component records.

As an example, the claim component files that are extracted may be stored as discrete files or records (or multiple discrete files or records) for, for example: (a) claim providers; (b) claim provider details; (c) customer service claim records details; (d) messages received from client in receiving claim; (e) claim occurrence codes and reference numbers; (e) payment information; (f) procedure information; (g) value codes and reference numbers; (h) related claims information (i.e., claims information from the client that was previously submitted) including related claim reference numbers and codes; (i) related claims materials including all component files from related claims; (j) condition information (i.e., information describing or identifying patient conditions related to the claim); (k) diagnosis information (i.e., information describing or identifying patient diagnosis related to the claim); (l) claim line information including service description and cost; (m) authorization information; (n) provider information; (o) authorization history and provider history (i.e., history in relation to previously submitted claims); (p) line pricing information; (q) stated reasons for approval or adjustment of claims; (r) remark codes; and (s) documentation including, for example, regulatory information and research information related to a claim.

The processor of the claim editing engine is also configured to transform the set of claim components to conform to a standardized data format for each of the set of claim components. Transforming the set of claim components includes any necessary pre-processing or processing to convert the file types or file formats of each claim component to a standardized claim component record type. The processor is additionally configured to integrate the set of transformed claim components into a set of unified claims by unifying each of the set of transformed claim components having matching claim identifiers into a unified claim. In other words, the processor identifies each claim component associated with the same underlying claim based on, for example, identifying claim reference numbers, reference codes, and reference metadata. As suggested above, in many cases claim components for a particular claim may be associated with a secondary claim (e.g., a historical claim from the same patient) that is integrated into a unified claim record for a current claim. Further, claim components may include documentation such as regulatory information or clinical information that is used to process or document a particular claim. As described herein, each unified claim includes unified claim components—therefore, each unified claim persists component elements that may be used in processing the unified claims. In at least some embodiments, claim components are transformed and integrated to conform to a defined unified claim record specification. In some such examples, the unified claim records are written to a common unified claim table. Individual unified claim records are typically associated with a claim reference number, a claim version number (wherein the most recent version includes the most recent claim data or edits), and a claim edit date. Accordingly, the unified claim records can be tracked and managed such that the most recent versions of the unified claim records are used.

The claim editing engine applies a "rule set" to the set of unified claims to generate a simulation of execution of the set of claims and identify errors in the simulated execution. The rule set described herein is a simulation and analysis tool that, in one embodiment, is generated on-demand based on definitions set by a user or based on comparison between prior claims data and prior error (and edit/change) records. In the first embodiment, where users may define (partially or in whole) a rule set, the claim editing engine (or an associated rule management system) receives a query input written by a human user. In the claim editing engine system and methods described, an edit engine compiler (or a rule engine) is provided that is capable of processing query inputs written in natural (i.e. human) readable languages and converting the query input into the rule set described herein. The rule set is, in turn, configured to process the unified claims to simulate the execution of the unified claims and identify potential points of error. Accordingly, the claim editing engine described provides a method for compiling natural language text into a claim analysis tool. The query input language of the edit engine compiler is capable of performing query functions including but not limited to syntactic clauses, expressions, predicates, computations and calculations, queries, statements, verifications and validation (e.g., checking that the value of a field is within an expected range or value, or that the value is a recognized option). The query input language is also capable of performing aggregations across multiple claims to determine whether related claims meet certain values. For instance, the query input language can be used to determine whether there are unified claim records (or groups of records) that match a particular value for a sum, count, or average of an attribute.

The query input language may also be used to define references, formulas, or functions that can be reused in later queries. For example, in some cases, a particular diagnosis may be associated with a particular provider specialty. The claim editing engine may determine such prior relationships and define query inputs indicating an expected edit, or a user may define specific relations such as, for example, a nurse specialty edit should be made when a particular diagnosis is provided in the unified claim record. Alternately, when a patient demographic data indicates a patient is under 18 or over 65, a validation that pediatrics or geriatrics is indicated may be made.

The claim editing engine is also configured to prioritize particular unified claim records based on derived characteristics. Using previously known methods, manual intervention was required to flag a claim for urgent review. The claim editing engine described may monitor the dates and times of service and apply applicable regulatory requirements to determine how much time is available to process a given claim. Based on such determinations, the claim editing engine may prioritize claims with the least available time remaining.

Notably, the claim editing engine systems and methods provided can manage query inputs and rule sets for more efficient processing. In one example, query inputs and rule sets may be shared or socialized to other claim editing engines.

The processor of the claim editing engine is also configured to apply the rule set to the set of unified claims to generate a simulation of execution of the set of claims and identify errors in the simulated execution. In at least some embodiments, the claim editing engine generates a version control record (or "change set record") while applying the rule set. In such embodiments, the version control record is included in the simulated execution and the instruction. As a result, the version control record identifies the rule set. The embedding of the version control record (i.e., an identifier that indicates pertinent information regarding the rule set including the identifier of the rule set, the author of the rule set, the date stamp when the rule set or query input were created, and the date of the execution of the rule set) identifies the rule set. In some embodiments, use of the version control model allows for efficient, rapid changes to rule sets by, for example "rolling back" or "rolling forward" from one rule set to another. As a result, a particular rule set that is not as effective as predecessor or successor can be rapidly deprecated without impact to the claim editing system. Alternately, "rolling back" or "rolling forward" to other rule set versions may be useful for analysis and improved query input generation. Further, tracking "change sets" or "version controls" of the rule sets allows for more effective review of claim edits because changes in flagging and edits can easily be explained. As indicated above, in some embodiments the rule set may be determined algorithmically based on prior analysis of edits, claim components, unified claims, and unified claim components.

Because rule sets can be shared, reused, and tracked, the rule sets can be used throughout a data processing system for claims without rewriting the rules. Further, the edit engine compiler may be configured to include "code compliance rules" that limit or restrict the variance of query inputs to known or accepted parameters for rule sets based on, for example, prior error detections and edits or user input.

The edit engine compiler provided are also configured to generate rule sets that can process complex claims. For example, the resulting rule sets can process claim data involving large, multidimensional lists such as, for example, provider name, provider type, provider location, diagnosis, value codes, occurrence codes, remark codes, procedure, payment, authorization type, and other attributes. Similarly, in some embodiments, the claim editing engine may apply the rule set across a categorical grouping such as a provider group, diagnosis, value codes, remark codes, procedure, payment, authorization type, or other attributes. For example, in one embodiment, the claim editing engine is configured to extract the set of claim components of the plurality of claim components from the data warehouse system. The set of claim components is associated with at least one of a plurality of distinct providers. In such embodiments, the claim editing engine is configured to apply the rule set simultaneously to each unified claim of a plurality of providers or other categories.

The rule sets described (and the underlying query inputs) also may utilize complex analysis patterns. Notably, the rule set and the query inputs may be written to recursively call claim components in a tree hierarchy. To effect this example, the processor of the claim editing engine is configured to receive the query input statement wherein the query input statement is designed to recursively call unified claim components from each unified claim. The processor is also configured to generate a tree hierarchy for each unified claim. In the example embodiment, the structure of the tree may be determined based on definitions provided with the query input, application of a sorting algorithm that may generate a tree using a binary mode, a random forest algorithm, or a nearest neighbor algorithm. The tree hierarchy is populated based on the unified claim components for each unified claim. The processor is also configured to apply the rule set recursively to the tree hierarchy of each unified claim. Using the described models of recursion and/or trees, one rule set may be provided based on a single query input and then provide extensive implementations and solutions by recursively calling different patterns. Additionally, the rule set may be implemented in a singular instance (i.e., on a claim-by-claim basis) or a parallel instance (i.e., across groups such as collections, authorization types, or provider types.)

The logic of a particular query input may also conditionally branch and include sub-logic elements. As such, the logic of a rule set may include distinct paths for different conditions such as different jurisdictions, different services, or different providers. For two given states, depending on regulatory requirements, the sub-logic may be entirely distinct. Similarly for two service categories, the sub-logic may be entirely distinct. Because of the options of sub-logic and conditional branching, the described claim editing engine can be used to create an entire tree structure of very complex logic that addresses varying conditions.

The edit engine compiler can additionally define common components of a query input that can be automatically generated based on patterns. This approach minimizes variance in the claim editing approaches, while providing robust functions because the query input language allows the ability to reference another component (i.e., an element of another query input or rule set). In a similar vein, the claim edit engine may be configured to cache results of claim analysis and simulation to make processing more efficient.

Further, the rule set can review unified claims as a whole or conditionally at an individual line/component level. For example, the rule set may be used to analyze a given claim and only process claim components meeting a certain set of conditions.

Upon the application of the rule set, the claim editing engine processor is configured to transmit an instruction to resolve each identified error associated with each simulated executed claim. In some examples, the claim editing engine automatically resolves errors. For example, the claim editing engine may apply the rule set to the set of unified claims to generate a simulation of execution of the set of claims and identify errors in the simulated execution and identify recommended edits for each identified error in the simulated execution. In further examples, the claim editing engine may automatically modify each unified claim associated with an identified error by applying the recommended edit. However, in many examples, a human reviewer is suggested or required. As such, in many examples a human reviewer (on a claim review device in communication with the claim editing engine) either receives the alert indicating errors and recommended edits, or reviews the modified unified claims. In all embodiments, the claim editing engine causes each resolved unified claim to be processed whether directly through the claim editing engine, through human manual intervention, or a combination thereof.

The systems and methods described provide significant quantitative and qualitative improvements over the prior techniques. Notably, it is contemplated that the claim editing engine may be used to radically enhance the throughput of claim review, the quality of claim review, the comprehensiveness of claim review, and the overall speed of the claim review process.

Generally, the systems and methods described herein are configured to perform at least the following steps: extract a set of claim components of the plurality of claim components from the data warehouse system; transform the set of claim components to conform to a standardized data format for each of the set of claim components; integrate the set of transformed claim components into a set of unified claims by unifying each of the set of transformed claim components having matching claim identifiers into a unified claim, wherein each unified claim includes unified claim components; apply a rule set to the set of unified claims to generate a simulation of execution of the set of claims and identify errors in the simulated execution; transmit an instruction to resolve each identified error associated with each simulated executed claim; cause each resolved unified claim to be processed; extract the set of claim components of the plurality of claim components from the data warehouse system, wherein the set of claim components is associated with at least one of a plurality of distinct providers; apply the rule set simultaneously to each unified claim of a plurality of providers; generate a version control record while applying the rule set, wherein the version control record is included in the simulated execution and the instruction, wherein the version control record identifies the rule set; receive a query input statement; apply an edit engine compiler to the query input statement to generate the rule set; receive the query input statement wherein the query input statement is designed to recursively call unified claim components from each unified claim; generate a tree hierarchy for each unified claim, wherein the tree hierarchy is generated based on the unified claim components for each unified claim; apply the rule set recursively to the tree hierarchy of each unified claim; apply the rule set to the set of unified claims to generate a simulation of execution of the set of claims and identify errors in the simulated execution; identify recommended edits for each identified error in the simulated execution; automatically modify each unified claim associated with an identified error by applying the recommended edit.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Va.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfilment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/ or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the use of the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
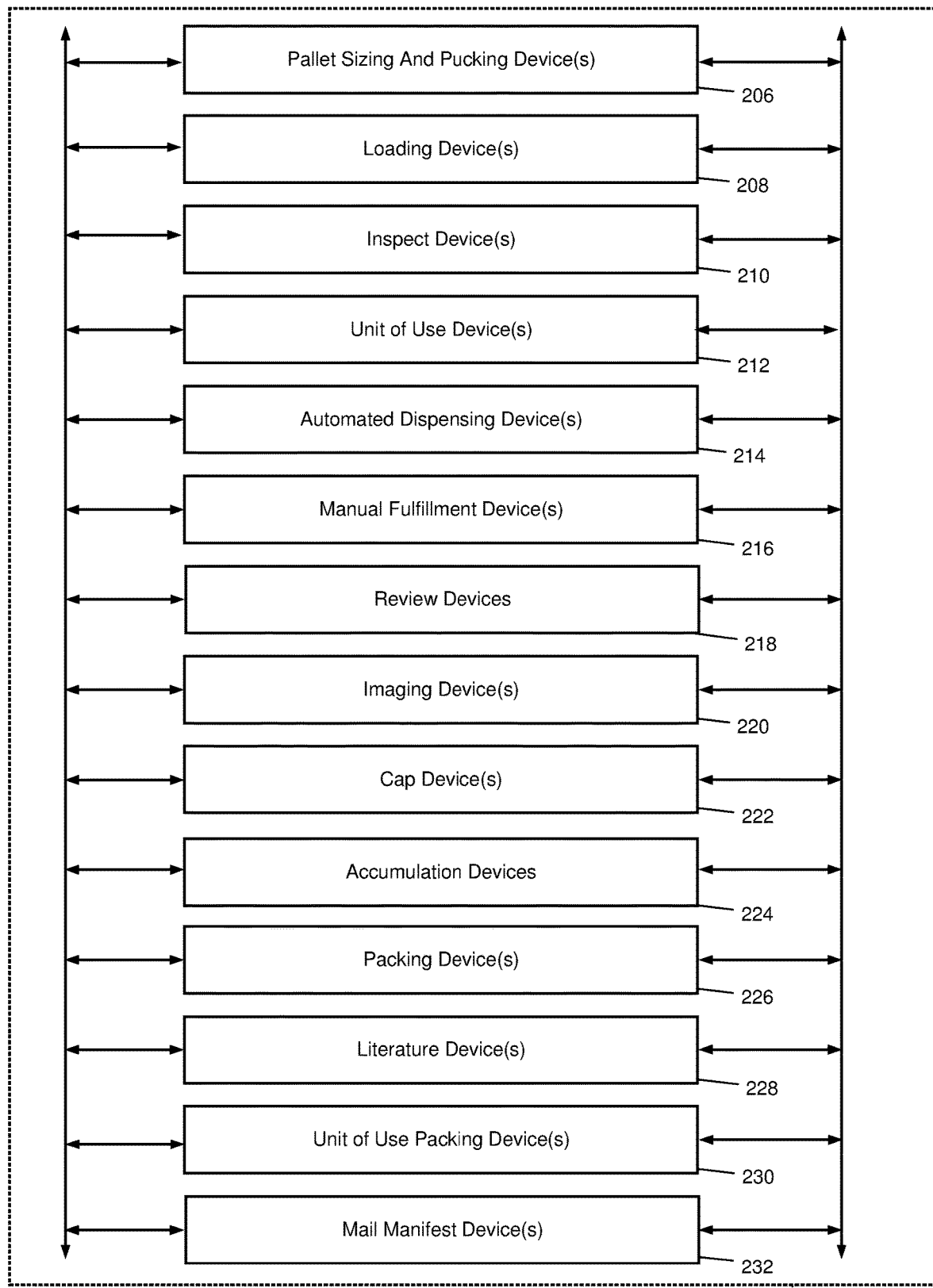
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
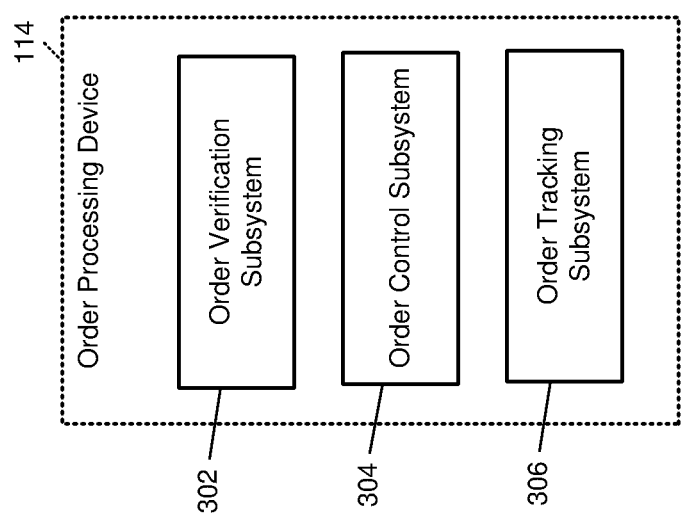
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may include order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Figure 4:
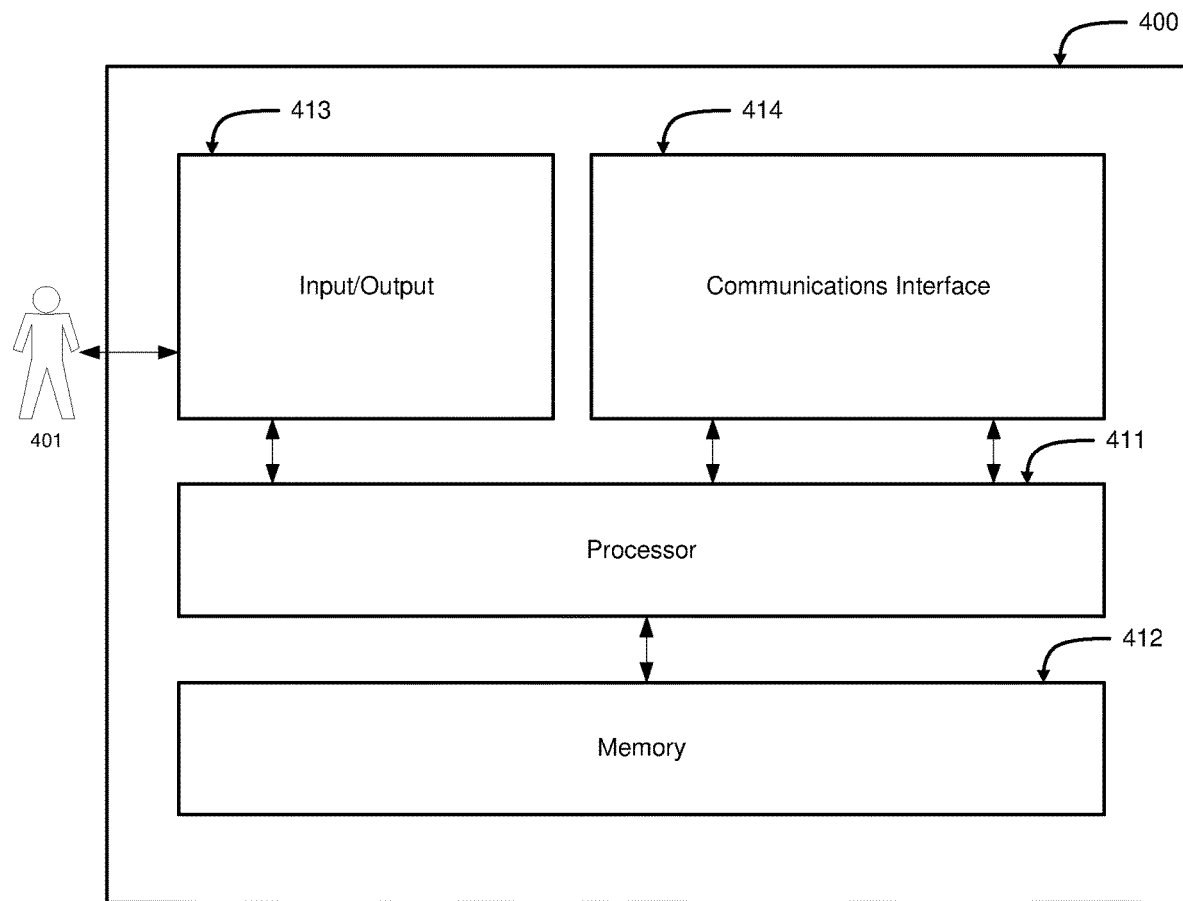
FIG. 4 is a functional block diagram of an example computing device that may be used in the claim editing system described.
Figure 5:
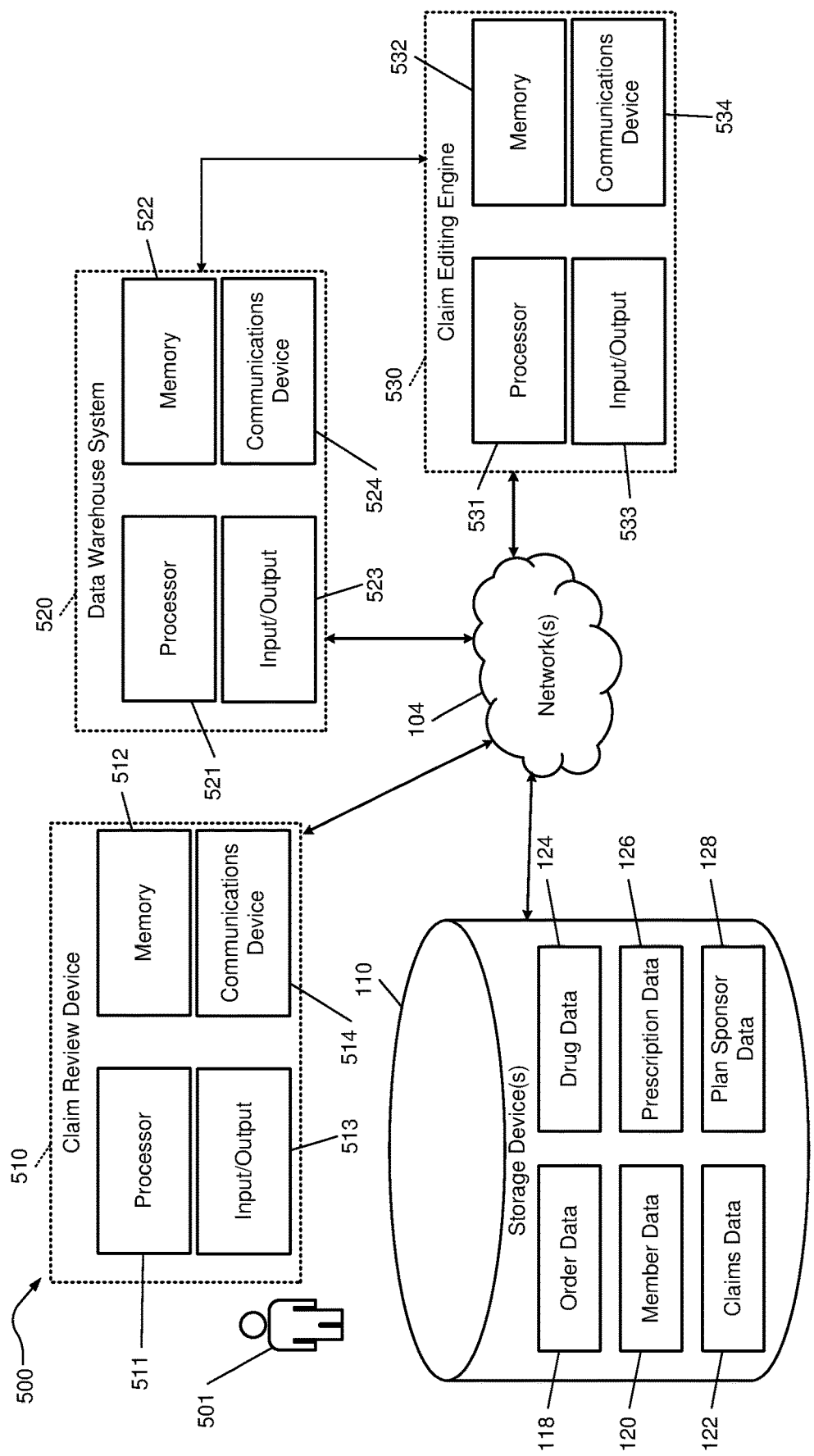
FIG. 5 is a functional block diagram of a claim editing system that may be deployed within the system of FIG. 1 using the computing devices shown in FIG. 4.

FIG. 4 is a functional block diagram of an example computing device 400 that may be used in the claim editing systems described, and may represent the data warehouse system, claim editing engine, and claim processing system (all shown in FIG. 5.) Specifically, computing device 400 illustrates an exemplary configuration of a computing device for the systems shown herein, and particularly in FIGS. 1 and 5. Computing device 400 illustrates an exemplary configuration of a computing device operated by a user 401 in accordance with one embodiment of the present invention. Computing device 400 may include, but is not limited to, the data warehouse system, claim editing engine, and claim processing system (all shown in FIG. 5.), other user systems, and other server systems. Computing device 400 may also include pharmacy devices 106 including pharmacy fulfillment devices 112, order processing devices 114, and pharmacy management devices 116, storage devices 110, benefit manager devices 102, and user devices 108 (all shown in FIG. 1), mobile computing devices, stationary computing devices, computing peripheral devices, smart phones, wearable computing devices, medical computing devices, and vehicular computing devices. Alternatively, computing device 400 may be any computing device capable of the claim editing methods for automated integration and error resolution of claim records. In some variations, the characteristics of the described components may be more or less advanced, primitive, or non-functional.

In the exemplary embodiment, computing device 400 includes a processor 411 for executing instructions. In some embodiments, executable instructions are stored in a memory area 412. Processor 411 may include one or more processing units, for example, a multi-core configuration. Memory area 412 is any device allowing information such as executable instructions and/or written works to be stored and retrieved. Memory area 412 may include one or more computer readable media.

Computing device 400 also includes at least one input/output component 413 for receiving information from and providing information to user 401. In some examples, input/output component 413 may be of limited functionality or non-functional as in the case of some wearable computing devices. In other examples, input/output component 413 is any component capable of conveying information to or receiving information from user 401. In some embodiments, input/output component 413 includes an output adapter such as a video adapter and/or an audio adapter. Input/output component 413 may alternatively include an output device such as a display device, a liquid crystal display (LCD), organic light emitting diode (OLED) display, or "electronic ink" display, or an audio output device, a speaker or headphones. Input/output component 413 may also include any devices, modules, or structures for receiving input from user 401. Input/output component 413 may therefore include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output and input device of input/output component 413. Input/output component 413 may further include multiple sub-components for carrying out input and output functions.

Computing device 400 may also include a communications interface 414, which may be communicatively coupleable to a remote device such as a remote computing device, a remote server, or any other suitable system. Communication interface 414 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX). Communications interface 414 is configured to allow computing device 400 to interface with any other computing device or network using an appropriate wireless or wired communications protocol such as, without limitation, BLUETOOTH®, Ethernet, or IEE 802.11. Communications interface 414 allows computing device 400 to communicate with any other computing devices with which it is in communication or connection.

FIG. 5 is a functional block diagram of a claim editing system 500 that may be deployed within the system of FIG. 1 using the computing device 400 (shown in FIG. 4.). As suggested in FIG. 5, the claim editing system 500 may be used in system 100 (shown in FIG. 1) and utilizes some of the same elements including storage device 110, order data 118, member data 120, claims data 122, drug data 124, prescription data 126, plan sponsor data 128, and is in connection to network 104 which can provide interconnection between and among the systems shown in FIG. 5 and the systems shown in FIG. 1. Alternately, claim editing system 500 may interconnect with other medical claims systems that include other claim information, claim components, and related information that is not shown in FIG. 1, and may accordingly access claim data for medical services and other services unrelated to that shown in FIG. 1. As shown in FIG. 5, claim editing system 500 includes storage device 110 and components 118, 120, 122, 124, 126, and 128, claim review device 510, data warehouse system 520, and claim editing engine 530. The computer systems 510, 520, and 530 each have an associated processor 511, 521, and 531, an associated memory 512, 522, and 532, an associated input/output 513, 523, and 533, and an associated communications device 514, 524, and 534. Such components function in a manner substantially similar to those described in computing device 400. Computer systems 510, 520, and 530 are in communication with one another and storage device(s) 110 either directly or through network(s) 104. As described above, in some embodiments computer systems 510, 520, and 530 are in communication with other devices such as those described in FIG. 1 via network(s) 104.

As described above and herein, claim editing system 500 is configured to automatically predict errors and validate data in pending claims, and to integrate claim data, using the methods described herein. Significantly, data warehouse system 520 is configured to store the claim components described and provide them to claim editing engine 530. In some examples data warehouse system 520 obtains the claim components from storage device 110 and, in some examples, from claims data 122. In other examples, data warehouse system 520 is substantially integrated with storage device 110. In still other examples, as described above, data warehouse is in communication with other claim processing systems (not shown) that provide it with claim component data. As described, claim editing engine 530 performs the functions and methods described and, as applicable, provides output to other systems including claim review device 510. Claim review device 510 represents a user terminal that allows an individual user to review claim records and be alerted regarding identified errors in unified claim records, notified of corrections or modifications of unified claim records based on identified errors, or notified to review modifications or make modifications.

Notably, although claim editing system 500 illustrates systems 510, 520, and 530 as distinct, in some examples they may be integrated with one another. In at least some embodiments, systems 520 and 530 are integrated into a single system capable of performing the processes described herein.

Figure 6:
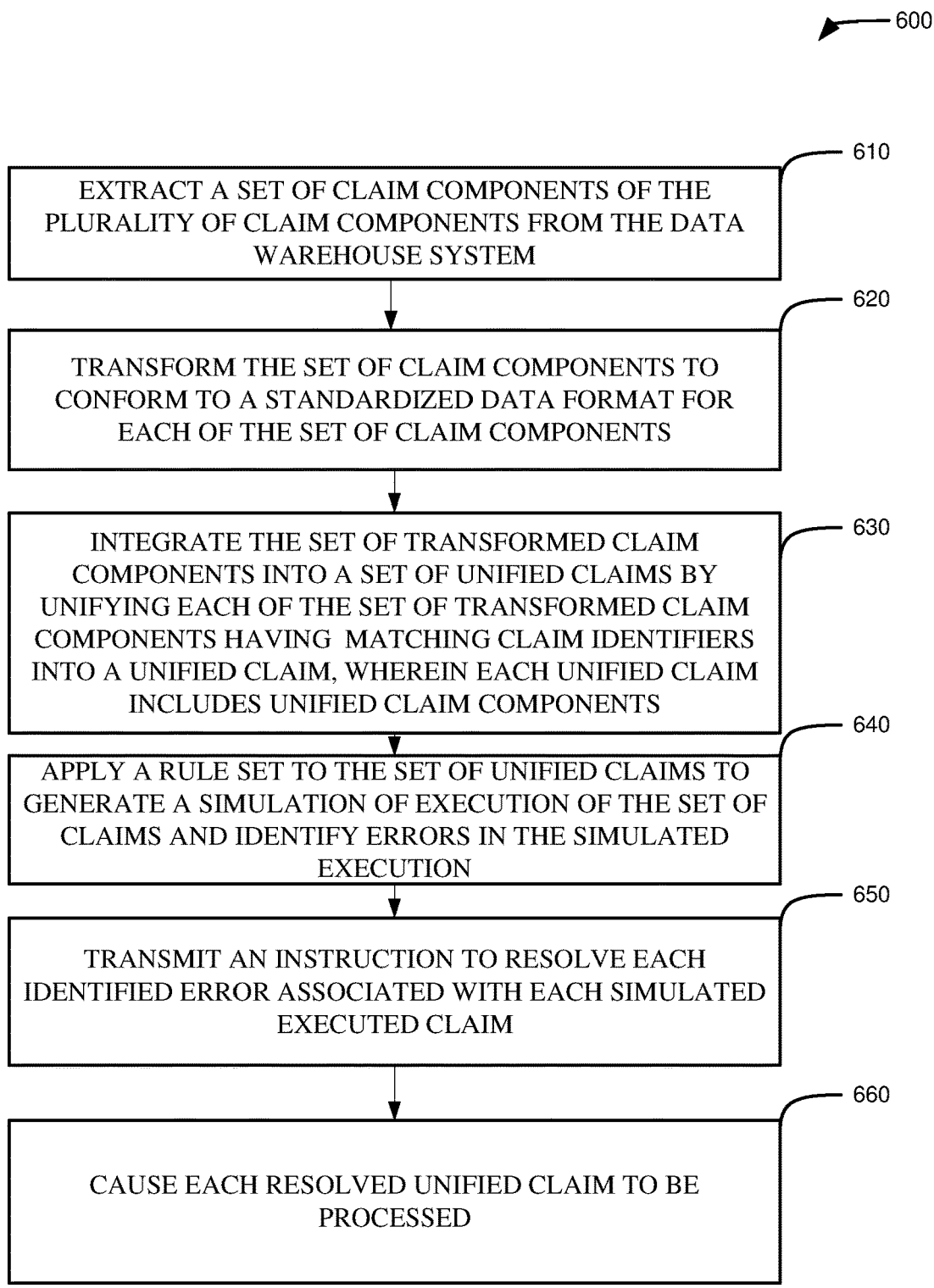
FIG. 6 is a flow diagram representing the automated claim integration and claim error resolution process from the perspective of the claim editing system shown in FIG. 5.

FIG. 6 is a flow diagram 600 representing the automated integration and claim error resolution process described from the perspective of the claim editing engine 530 (shown in FIG. 5.) Flow diagram 600 depicts the exemplary steps that are executed by claim editing engine 530 in the context of claim editing system 500 (shown in FIG. 5).

In the example embodiment, claim editing engine 530 extracts 610 a set of claim components of the plurality of claim components from the data warehouse system 520 (shown in FIG. 5). As described above, the set of claim components include heterogeneous records stored in heterogeneous formats. To provide the integrative functions described, claim editing engine 530 transforms 620 the set of claim components to conform to a standardized data format for each of the set of claim components, thereby substantially homogenizing the claim components for processing. Claim editing engine 530 also integrates 630 the set of transformed claim components into a set of unified claims by unifying each of the set of transformed claim components having matching claim identifiers into a unified claim. Each unified claim includes unified claim components.

Claim editing engine 530 also applies 640 a rule set to the set of unified claims to generate a simulation of execution of the set of claims and identify errors in the simulated execution. As described above, the rule set is generated by the edit engine compiler processing a query input that is generated automatically, by a human user, or a combination thereof. The edit engine compiler is configured to process the query input as written in natural language. Claim editing engine 530 also transmits 650 an instruction to resolve each identified error associated with each simulated executed claim. In some examples, the instruction is provided to claim editing engine 530 for review and modification, while in others the instruction is sent to claim review device 510 to await human review and necessary modification. Claim editing engine 530 also causes 640 each resolved unified claim to be processed.

Figure 7:
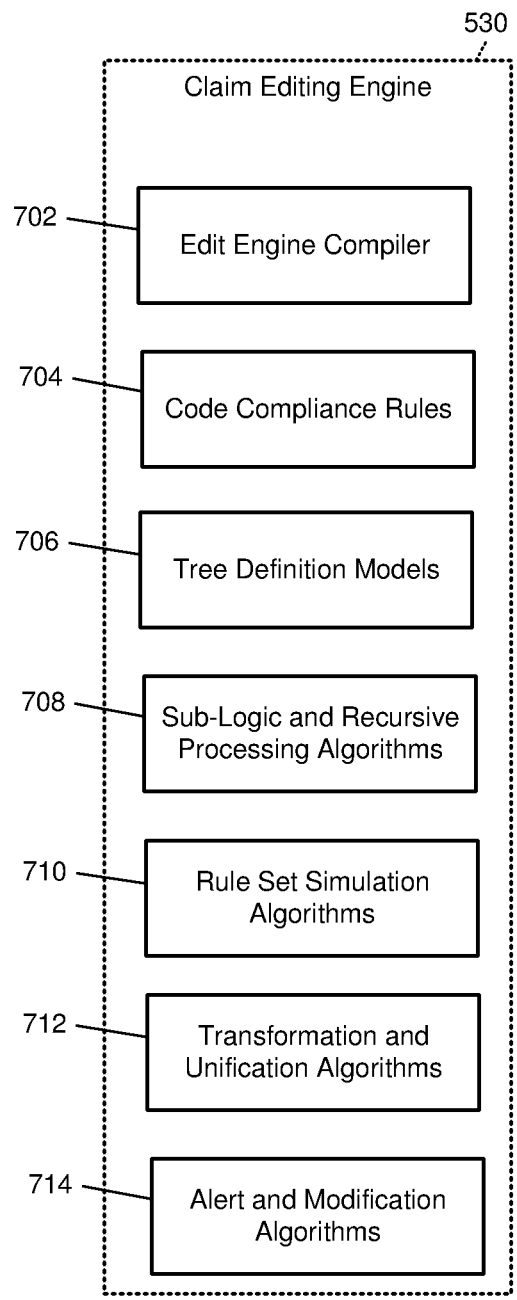
FIG. 7 is a diagram of elements of one or more example computing devices that may be used in the system shown in FIGS. 1 and 5.

FIG. 7 is a diagram of elements of one or more example computing devices that may be used in the system shown in FIGS. 1 and 5. Specifically, FIG. 7 describes subsystems available to claim editing engine 530 capable of providing the functionality described herein. Claim editing engine 530 includes an edit engine compiler 702 that is configured to define the compilation process that converts input queries into rule sets. Likewise, claim editing engine 530 includes code compliance rules 704 that that limit or restrict the variance of query inputs to known or accepted parameters for rule sets based on, for example, prior error detections and edits or user input. Claim editing engine 530 also includes tree definition models 706 that allow for converting claim component data into tree structures for enhanced processing. Claim editing engine 530 also includes sub-logic and recursive algorithms 708 that may be used in generating complex rule sets as described above. Claim editing engine 530 also includes rule set simulation algorithms 710 that are used to simulate the execution of unified claim records in singular or multiple instances. Claim editing engine 530 further includes transformation and unification algorithms 712 that are configured to transform the set of claim components to conform to a standardized data format for each of the set of claim components. Algorithms 712 are also configured to integrate the set of transformed claim components into a set of unified claims by unifying each of the set of transformed claim components having matching claim identifiers into a unified claim. Claim editing engine 530 also includes alert and modification algorithms 714 that allow claim editing engine 530 to communicate to any necessary system or party to transmit an instruction to resolve each identified error associated with each simulated executed claim and make any necessary modifications.

Figure 8:
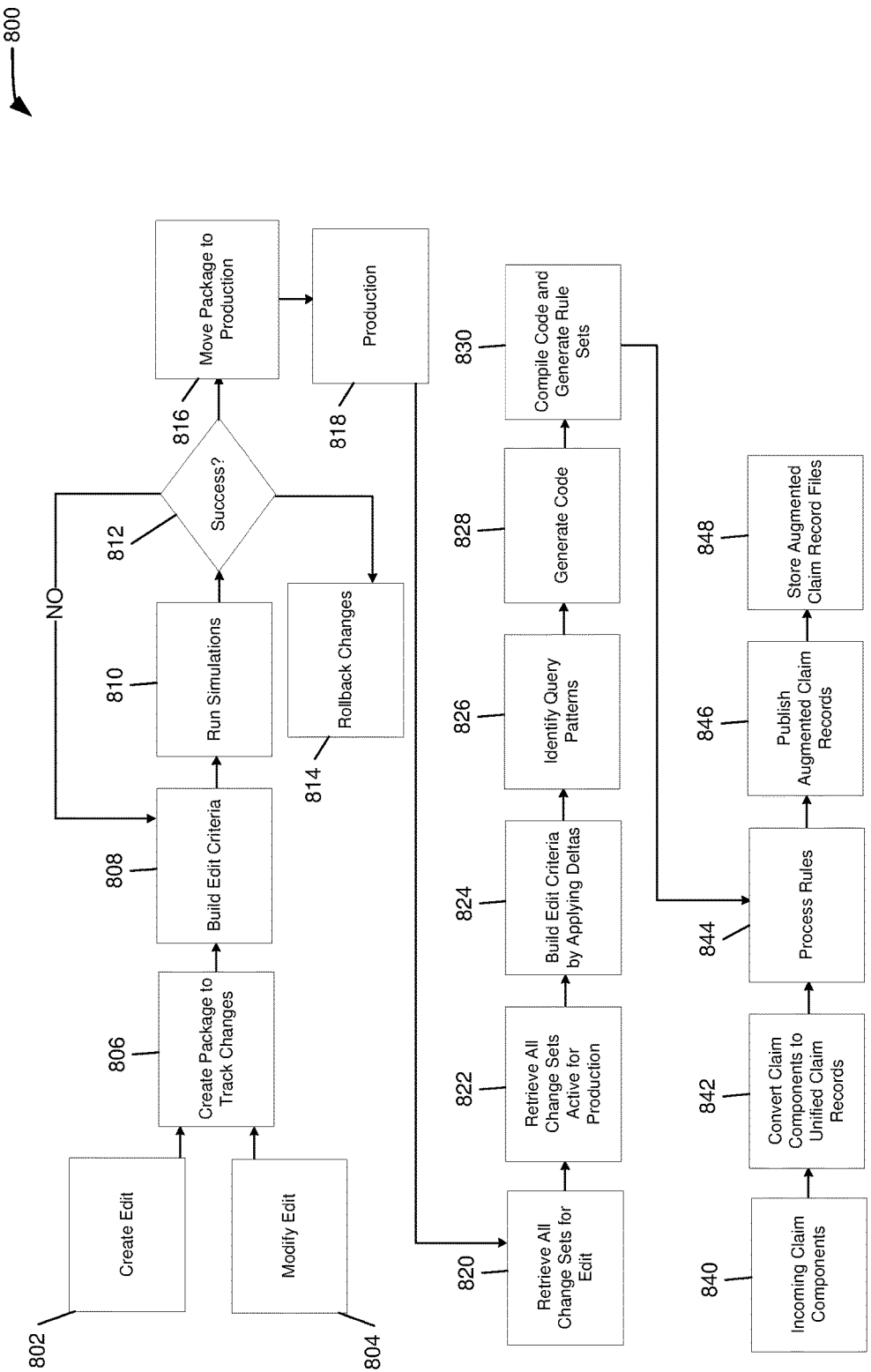
FIG. 8 is a diagram illustrating the data processing workflow in the claim editing system of FIG. 5.

FIG. 8 is a diagram illustrating the data processing workflow 800 in the claim editing system of FIG. 5. Specifically, workflow 800 illustrates the process of automatically transforming and integrating claim records into a unified claim record, defining rule sets, and processing the unified claim records with the rule sets. As described, process 800 entails claim editing system 500 (and, more specifically, claim editing engine 530) initiating a process by either seeking to create 802 a new "edit" (i.e., modification to a claim record) or modify 804 an existing edit. In either process, claim editing engine 530 builds a rule set for potential use on unified claim records. Claim editing engine 530 creates 806 a package to track changes and builds 808 edit criteria (i.e., defines query inputs for rules) which are run in a simulation 810 recent claim data. In one example, the simulation 810 is run on unified claim data from the past two months. If the simulation 810 is unsuccessful 812, the changes may be rolled back 814 or the claim editing engine 530 may revert to building 808 again. If the simulation 810 is successful 812, the package is moved 816 into production 818. Claim editing engine 530 retrieves all change sets (or versions of the rule set) for the edit 820 and all change sets that are in production 822 and builds a new edit criteria (i.e., rule set) by finding deltas (or differences) 824 between set 820 and set 822. After finding such "deltas" 824, claim editing engine 530 identifies query patterns 826 and generates query input code 828 which is then compiled 830. Separately, claim editing engine 530 receives 840 incoming claim components and converts/transforms 842 such components into unified claim records which are processed 844 using the newly compiled rule set. Processing 844 causes further simulations of execution of the unified claim records which results in any necessary edits which are then published as augmented unified claim records 846 and stored 848.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A claim editing system for automated integration and error resolution of electronic, health-related claim records that include a plurality of claim components, comprising:
   a data warehouse system comprising a first processor and a first memory, the data warehouse system further including the electronic, health-related claim records that include the plurality of claim components, wherein each of the plurality of claim components is associated with a claim identifier; and
   a health-related claim editing engine in communication with the data warehouse system, the health-related claim editing engine comprising a second processor and a second memory, wherein the second processor is configured to:
   extract a set of claim components of the plurality of claim components from the data warehouse system;
   transform the set of claim components to conform to a standardized data format for each of the set of claim components;
   integrate the set of transformed claim components into a set of unified claim records by unifying each of the set of transformed claim components having matching ones of the claim identifiers into a unified claim record of the set of unified claim records, wherein each unified claim record includes unified claim components;
   apply a rule set to the set of unified claim records to generate a simulated execution of the set of unified claim records and identify predicted errors in the simulated execution, wherein the predicted errors are predicted to cause a cessation of execution of a claim process associated with the set of unified claim records;
   generate an instruction to resolve each predicted error associated with the simulated execution, wherein the instruction is associated with a recommended edit to resolve the predicted errors so that the claim process is executable without the cessation being caused by the predicted errors, wherein the instruction is associated with a generation of one or more resolved unified claim records based on one or more claim records of the set of unified claim records that are associated with the predicted errors; and
   cause each of the one or more resolved unified claim records to be processed.

2. The claim editing system of claim 1, wherein the set of claim components is associated with at least one of a plurality of distinct providers, and the second processor is further configured to:
   apply the rule set simultaneously to each unified claim record of the at least one of the plurality of distinct providers.

3. The claim editing system of claim 1, wherein the second processor is further configured to:
   generate a version control record while applying the rule set, wherein the version control record is included in the simulated execution and the instruction, wherein the version control record identifies the rule set.

4. The claim editing system of claim 1, wherein the second processor is further configured to:
   receive a query input statement; and
   apply an edit engine compiler to the query input statement to generate the rule set.

5. The claim editing system of claim 4, wherein the second processor is further configured to:
   receive the query input statement, wherein the query input statement is designed to recursively call the unified claim components from each unified claim record;
   generate a tree hierarchy for each respective unified claim record of the set of unified claim records such that the tree hierarchy is generated based on the unified claim components for the respective unified claim record; and
   apply the rule set recursively to the tree hierarchy of each unified claim record.

6. The claim editing system of claim 1, wherein the recommended edit includes a recommended edit for each predicted error in the simulated execution.

7. The claim editing system of claim 6, wherein the second processor is further configured to:
   automatically modify each unified claim record associated with a respective predicted error of the predicted errors by applying the recommended edit associated with the respective predicted error.

8. A method for automated integration and error resolution of electronic, health-related claim records performed by a health-related claim editing engine in communication with a data warehouse system, the health-related claim editing engine including a processor and a memory, the data warehouse system including a data warehouse processor and a data warehouse memory, the data warehouse system further including the electronic, health-related claim records, the electronic, health-related claim records including a plurality of claim components each associated with a claim identifier, said method comprising:
   extracting a set of claim components of the plurality of claim components from the data warehouse system;
   transforming the set of claim components to conform to a standardized data format for each of the set of claim components;
   integrating the set of transformed claim components into a set of unified claim records by unifying each of the set of transformed claim components having matching ones of the claim identifiers into a unified claim record of the set of unified claim records, wherein each unified claim record includes unified claim components;
   applying a rule set to the set of unified claim records to generate a simulated execution of the set of unified claim records and identify predicted errors in the simulated execution, wherein the predicted errors are predicted to cause a cessation of execution of a claim process associated with the set of unified claim records;
   generating an instruction to resolve each predicted error associated with the simulated execution, wherein the instruction is associated with a recommended edit to resolve the predicted errors so that the claim process is executable without the cessation being caused by the predicted errors, wherein the instruction is associated with a generation of one or more resolved unified claim records based on one or more claim records of the set of unified claim records that are associated with the predicted errors; and
   causing each of the one or more resolved unified claim records to be processed.

9. The method of claim 8, wherein the set of claim components is associated with at least one of a plurality of distinct providers, and the method further comprises:
   applying the rule set simultaneously to each unified claim record of the at least one of the plurality of distinct providers.

10. The method of claim 8, further comprising:
    generating a version control record while applying the rule set, wherein the version control record is included in the simulated execution and the instruction, wherein the version control record identifies the rule set.

11. The method of claim 8, further comprising:
receiving a query input statement; and
applying an edit engine compiler to the query input statement to generate the rule set.

12. The method of claim 11, further comprising:
receiving the query input statement, wherein the query input statement is designed to recursively call the unified claim components from each unified claim record;
generating a tree hierarchy for each respective unified claim record of the set of unified claim records such that the tree hierarchy is generated based on the unified claim components for the respective unified claim record; and
applying the rule set recursively to the tree hierarchy of each unified claim record.

13. The method of claim 8,
wherein the recommended edit includes a recommended edit for each predicted error in the simulated execution.

14. The method of claim 13, further comprising:
automatically modifying each unified claim record associated with a respective predicted error of the predicted errors by applying the recommended edit associated with the respective predicted error.

15. A health-related claim editing engine for automated integration and error resolution of electronic, health-related claim records that include a plurality of claim components, the health-related claim editing engine including a processor and a memory, said processor is configured to:
extract a set of claim components of the plurality of claim components;
transform the set of claim components to conform to a standardized data format for each of the set of claim components;
integrate the set of transformed claim components into a set of unified claim records by unifying each of the set of transformed claim components having matching claim identifiers into a unified claim record of the set of unified claim records, wherein each unified claim record includes unified claim components;
apply a rule set to the set of unified claim records to generate a simulated execution of the set of unified claim records and identify predicted errors in the simulated execution, wherein the predicted errors are predicted to cause cessation of execution of a claim process associated with the set of unified claim records;
generate an instruction to resolve each predicted error associated with the simulated execution, wherein the instruction is associated with a recommended edit to resolve the predicted errors so that the claim process is executable without the cessation being caused by the predicted errors, wherein the instruction is associated with a generation of one or more resolved unified claim records based on one or more claim records of the set of unified claim records that are associated with the predicted errors; and
cause each of the one or more resolved unified claim records to be processed.

16. The health-related claim editing engine of claim 15, wherein the set of claim components is associated with at least one of a plurality of distinct providers, and the processor is further configured to:
apply the rule set simultaneously to each unified claim record of the at least one of the plurality of distinct providers.

17. The health-related claim editing engine of claim 15, wherein the processor is further configured to:
generate a version control record while applying the rule set, wherein the version control record is included in the simulated execution and the instruction, wherein the version control record identifies the rule set.

18. The health-related claim editing engine of claim 15, wherein the processor is further configured to:
receive a query input statement; and
apply an edit engine compiler to the query input statement to generate the rule set.

19. The health-related claim editing engine of claim 18, wherein the processor is further configured to:
receive the query input statement, wherein the query input statement is designed to recursively call the unified claim components from each unified claim record;
generate a tree hierarchy for each respective unified claim record of the set of unified claim records such that the tree hierarchy is generated based on the unified claim components for the respective unified claim record; and
apply the rule set recursively to the tree hierarchy of each unified claim record.

20. The health-related claim editing engine of claim 15, wherein:
the recommended edit includes a recommended edit for each predicted error in the simulated execution; and
the processor is further configured to automatically modify each unified claim associated with a respective identified error of the identified errors by applying the recommended edit associated with the respective identified error.

\* \* \* \* \*